Patented Sept. 10, 1940

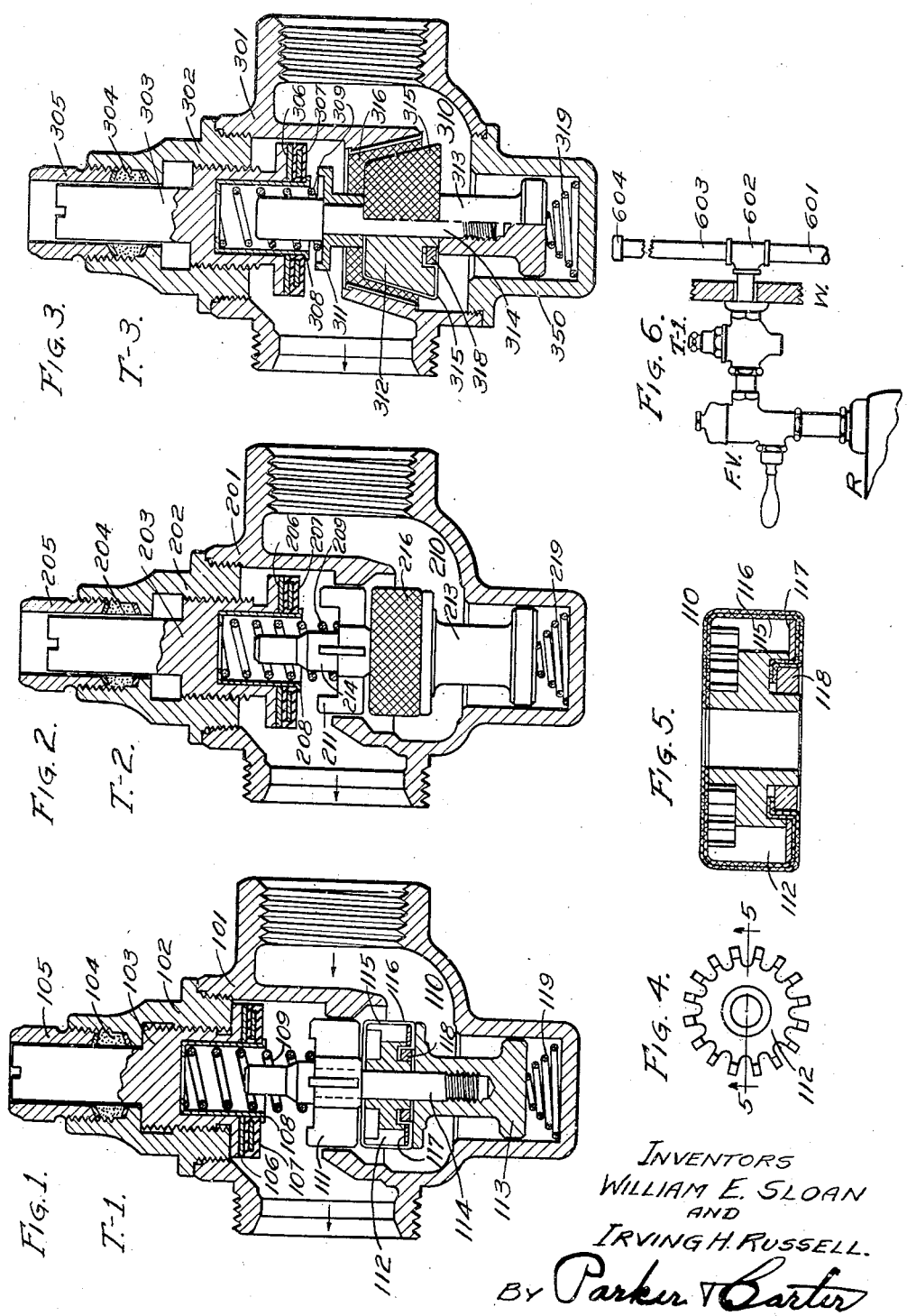

2,214,287

UNITED STATES PATENT OFFICE

2,214,287

VALVE

William E. Sloan, River Forest, and Irving H. Russell, Oak Park, Ill., assignors to Sloan Valve Company, Chicago, Ill., a corporation of Illinois Application February 8, 1937, Serial No. 124,534

4 Claims. (Cl. 137—111)

Our invention relates to silent-throttling devices generally, but is concerned more particularly with such devices as are suitable for throttling the flow through flush valves from high-pressure sources. One object is the production of a self-cleaning silent-throttling device.

A further object of the invention is the production of a silent throttling device which automatically adjusts itself for a substantially uniform rate of flow under widely varying supply pressures.

It is a further object of the invention to produce a combined shut off valve and silent-throttling device.

It is well known that water pressures vary considerably in many water systems from point to point, especially in those water systems which supply tall buildings or supply municipalities laid out on hilly or sloping ground. The water pressure must be sufficiently great to supply water at normal pressure to the highest points, resulting often in abnormally high pressures at low points in the system. In addition, the water pressure often fluctuates widely at a given point, owing to the varying demands made upon the system.

Because a flush valve opens wide to allow water to flow at a rate which is about at an optimum value when the water pressure is normal, there is such a high rate of flow at high pressure that undesirable splashing occurs in the receptacle being flushed, accompanied by a considerable amount of noise emitted both by the discharged water and the piping system from which it emerges. Also, the high rate of flow resulting from high pressure is often uneconomical in the use of water, as the water in the receptacle being flushed builds up to such a level that the cleansing is not effective unless the total amount of water allowed for the flush is greatly increased.

The rate of flow through a flush valve from a point of high pressure is customarily throttled to the desired value by a partial closing of the usual stop valve or shut-off valve customarily installed individual to the flush valve and between it and the supply line. This arrangement overcomes the splashing and the attendant noises at the receptacle, as well as the inefficient use of water, but with high pressure, the throttle valve must be nearly closed, whereby the orifice through which all of the water must pass at the correct rate of flow for flushing the fixture becomes very small, causing the velocity to be very great. Under this condition a disturbing noise is generated at the throttle valve and is transmitted more or less throughout the piping system. This noise is highly objectionable, particularly in residence buildings.

Any successful arrangement for reducing the throttling noise attendant upon throttling a high pressure must be based upon the use of a throttling orifice or passageway which has both sufficient length and sufficient specific frictional retardation upon the velocity of water that the throttling orifice can be enlarged sufficiently that the desired rate of flow is obtained through this larger orifice, but at a velocity sufficiently low that the throttling noises hereinbefore discussed do not arise. Where throttling devices are fixed in position they are subject to clogging from whatever solid particles may be present in the water passing through them, generally sand, but sometimes particles of vegetable matter, and the like.

Tests have shown that a clogged throttling device can be restored to normal usefulness by separating the parts thereof and permitting them to be washed by the water flowing through the throttling device under a condition of less restriction. A further object of our invention is to provide a silent-throttling device of such a construction that the parts thereof are automatically opened periodically to permit any accumulated foreign matter to be washed out by the flow of water. The invention has as a further object to provide a silent-throttling device wherein the silent-throttling action is secured by passing the water along opposed surfaces which cause the silent-throttling action.

Other objects and features of the invention will become more apparent upon a further perusal of the specification in connection with the accompanying drawing.

Referring now to the drawing, comprising Figures 1 to 6, they show sufficient views of silent-throttling devices constructed in accordance with the features of the invention to enable the invention to be understood.

Figure 1 shows the silent-throttling device T—1 which employs a screen cartridge which is normally out of the throttle opening, but is forced into the throttle opening upon each operation of an associated flush valve, and is provided with a regulating spring so proportioned that the amount of throttling is changed according to the pressure so that there is a substantially uniform rate of flow under widely differing conditions of pressure;

Figure 2 shows a device T—2 similar to that of Figure 1 except that the controlling spring thereof is of such characteristics that it drives the silencing member out of the throttling port under a condition of no flow, but it does not automatically regulate for varying pressures, reliance being had upon a manual adjustment of the amount of throttling;

Figure 3 shows silent-throttling device T—3, which is a further modification, and it differs from Figure 2 principally in the nature and configuration of the throttling port and of the cooperating movable member in order to secure variable silent throttling by an increase of the free waterway rather than by regulation of the area of screen member exposed for the passage of water;

Figure 4 is a plan view of the screen core 112 of Figure 1;

Figure 5 is an enlarged sectional view of the core of Figure 4 taken on the line 5—5 in the direction indicated by the arrows and showing the silencing screens attached; and Figure 6 shows the throttling device T—1 of Figure 1 connected up for service.

Referring now particularly to Figure 6, water is supplied from the branch supply pipe 601 to the receptacle R by way of the flush valve FV, the flow being suitably throttled by the throttling device T—1. Back of the wall W, an air chamber is provided by the pipe 603 which is threaded into the top opening of the tee fitting 602 and capped at 604. An air chamber, it will be understood, is desirable in any situation where the velocity of a long column of water is rapidly changed, as by the sudden closing of a valve, to prevent what is commonly referred to as water-hammer. The flush valve FV may be of any well-known construction, such as that shown in the Kocour Patent 2,007,652, granted July 9, 1935.

Referring now particularly to Figure 1 and taking note of Figures 4 and 5, the construction and operation of the throttling device T—1 will be explained under the assumption that it is installed substantially as shown in Figure 6.

The throttling device T—1 is housed in the casting 101 having an inlet opening at the right and an outlet opening at the left. The casting is provided with a central web member which separates the inlet opening from the outlet opening and through which there is a vertical port for throttling in connection with the silent-throttling element 110, formed as one unit of the illustrated travelling assembly.

The bonnet 102 is threaded into the body portion 101 and is arranged to threadably receive the valve member 103. The packing 104 seals the space around the stem of the valve member 103 when compressed by the packing gland 105. The valve member 103 is provided with a reinforced seat member 107 for seating around the periphery of the central port to shut off the flow entirely through the throttling device when desired. This seat element is held in place by the retaining tube 108, which is provided with a flange at the lower end thereof for this purpose, the upper end of which tube is partly closed to enable the tube to be held in place by the spring 109. The loosely fitting washer 106 is provided to enable the seat element 107 to rotate readily with respect to the valve element 103 as the shut off valve is about to seat, thereby preserving the surface of the seat element from abrasion.

The travelling assembly, composed of the screen element 110 and the associated guiding parts, is held together by the stem 114 which has a shoulder for holding the vaned guide 111 and is threaded into the piston member 113. The screen element 110 is composed of two layers of screen, inner screen 115 and outer screen 116, drawn into a cuplike form and stretched tightly over the core member 112, best shown in Figures 4 and 5. Eighty-mesh (eighty wires to the inch) screen has been found to be satisfactory. The screens 115 and 116 are held in place by the retaining ring 118 which fits tightly after being driven into position. The screens are held in shape by the core 112, and the core is milled away as shown to permit water to flow freely through the interior of the screen cartridge. The washer 117 closes off the bottom of the milled slots in the core 112, rendering the bottom of the screen element impervious.

With the throttling device T—1 connected for service as indicated in Figure 6, the parts are in the position shown in Figure 1 with the flush valve FV in closed position. Now, if the flush valve FV is operated in the usual manner, water commences to flow from the supply pipe 601 through the throttling device T—1 and by way of the flush valve FV to the receptacle R. The water which flows at the beginning is free to pass around the silencing cartridge 110 without passing through it. As the flow builds up, the urge on the travelling assembly including the silencing cartridge 110 increases, and the spring 109 begins to be compressed. The silencing element 110 soon enters the throttling port, the clearance being sufficiently small that practically all of the water passed by the throttling device in this position passes through the cartridge 110. When this condition obtains, the push on the travelling assembly is materially increased; the cartridge enters further into the throttling orifice, compressing the spring 109 still further, and causing a "floating" equilibrium to be reached at which the desired discharge occurs.

The spring 109 is designed to have such stiffness that the back pressure due to the spring increases quite rapidly as the spring is compressed.

As a result of this arrangement, while the silencing element 110 is driven much further into the throttling port when the line pressure is high (100 pounds to the square inch for example) than it is when the line pressure is low (thirty to thirty-five pounds to the square inch), the discharge rate remains practically constant, being only slightly higher at 100 pounds than it is at about thirty to thirty-five pounds pressure to the square inch.

It is to be noted that the top of the plunger member 113 is flared out to about the same diameter as the bottom of the silencing element 110. This cooperates with the close-off washer 117 to render the bottom of the silencing element 110 impervious to the flow water, forcing the inflow to member 110 to take place through the side, while the outflow may take place through the top and through as much of the side as is exposed above the throttling orifice. Therefore, as the silencing element is driven further into the throttling orifice, the area through which the inflow of water can take place through the assembly 110 is proportionately restricted. The stiffness of spring 109 is preferably such that a slight increase in the flow above that just necessary to maintain the screen element 110 within the throttling orifice will suffice to drive the screen element further into the orifice, until the bottom line thereof is very nearly brought within the throttling orifice. This latter position is the one assumed by the screen element when the travelling assembly has been moved in by a maximum line pressure of about 100 pounds to the square inch.

The travelling assembly maintains its assumed position, with the member 110 more or less in the throttling orifice depending upon the line pressure, as long as the flush valve FV remains substantially wide open. However, as the flush valve FV starts to close and begins to exert throttling action, the travelling assembly starts to be returned toward its normal position by spring 109. As soon as the flow falls somewhat below the normal amount, the screen element 110 is withdrawn entirely from the throttling orifice. This action occurs before the flush valve has entirely seated and while there is still a substantial flow of water (known as the refill flow). This flow of water along the sides of the screen element 110 tends to loosen any lodged particles and permit them to be washed away. This action is made easy because the screen is removed from the throttling orifice, whereby any lodged particles are not wedged between the exposed screen and some other part of the device. This washing operation taking place at the end of a flush is followed by a further washing operation taking place at the beginning of the next succeeding operation of the flush valve before the screen can take up its throttling position.

When the flush valve FV has finally seated and the flow has entirely ceased, the parts are returned to the position indicated in the drawing.

Because of the fact that the rate of flow must of necessity reach a quite substantial value before the water takes hold of the travelling assembly and forces the screen member 110 within the throttling orifice, and because the pressure drop at the throttling orifice suddenly increases when this movement takes place, there is a tendency for a water-hammer to occur at the beginning of each flush. This tendency is largely overcome by the piston 113, which fits rather closely into the cylinder formed at the bottom of the casting 101. The sudden movement of the travelling assembly to throttling position is prevented by the piston 113. This arrangement prevents the moving column of water from temporarily driving the member 110 materially beyond its ultimate throttling position determined by the pressure of the water and the restraining influence of the regulating spring 109.

A slight swishing noise of momentary duration is often observed at the instant that the travelling assembly is entering the throttling orifice, but this noise is not ordinarily noticeable except to someone near the device who is particularly listening for it. Within the range of pressures previously mentioned for which the device of Figure 1 was designed, this device has proved to be almost completely quiet. It will be observed that the device should be about as quiet at one position of throttling adjustment as at another because the core 112 of the silencing element is cut away so that the interior is largely hollow and the only material effect produced by changing the amount that the silencing element is inserted into the throttling orifice is in the entrance area exposed to the flow of water. By this arrangement, the area of the entering screen is varied according to the extent to which the travelling assembly is moved, but the velocity of the water that moves through the screen is substantially independent of the entrance area, being dependent only on the pressure drop through the throttling device.

In the event that a slightly greater flow is required at the fixture than is obtained with the device adjusted as shown in the drawing, the valve element 103 may be adjusted inwardly through the screw-driver slot in the top end of the stem thereof, bringing down the upper end of the regulating spring 109 a corresponding amount. Under this condition, the travelling assembly is prevented from entering so far into the throttling orifice, whereby a greater flow is permitted, which greater flow remains substantially uniform over a wide pressure range as previously disclosed.

It may be pointed out that spring 119 is provided to keep the travelling assembly from standing normally at a position below that shown in the drawing, as it is desired that the travelling assembly be acted upon and started to be drawn into the throttling position almost as soon as flow starts to take place.

When a new installation is made, the throttling device is preferably installed with the valve element 103 turned all the way in and with the seat element 107 firmly in contact with the fixed seat surrounding the throttling orifice, thereby entirely closing off the opening through the throttling device. In this position of the device, the relatively strong spring 109 pushes the travelling assembly down until spiral spring 119 is almost completely compressed. The screen element 110 is at that time well away from the entrance to the throttling port. Then, when it is desired to flush out the newly installed pipes, the valve element 105 is turned back one or two turns to permit a large unobstructed flow through the piping system and out through the flush valve to flush out any chips and other foreign matter that may be in the pipes to prevent their subsequent lodgement in the throttling device or in the flush valve FV. In this "blowout" position, the screen element 112 remains entirely away from the throttling orifice to permit the unrestricted flow to take place.

The device T—1 may be throttled just as an ordinary device by adjusting it so that the seat element 107 is at the desired distance from the fixed seat, the screen element 110 remaining out of throttling position.

Referring now to Figure 2, the parts 201 to 219 of this device are the same as the corresponding parts 101 to 119 of the device of Figure 1, with the exception of the spring 209 and the guide member 211. The spring 209 is made substantially weaker, or less stiff, than the spring 109, whereby when substantial flow takes place through the throttling device T—2 the travelling assembly is moved until the top of the guide 211 comes into contact with the seat element 207, thereby providing a throttle opening which depends only on the adjustment up or down of the valve element 203. For a medium throttle opening, the valve element may be adjusted as shown in Figure 2. With this adjustment, when flow takes place, the screen element 216 is driven about one-third of the way into the throttling orifice, giving a medium throttle opening. In the event that more throttling is desired, the valve stem 203 may be turned back toward a more open position of the valve element 207. In this position, the travelling assembly is allowed to move further and carry the element 210 further into the throttling orifice, thereby giving greater throttling. The vanes of the guide-piece 211 are cut down somewhat in the center to permit the water to pass more freely with the top of the vanes in contact with the seat element 207.

When the line pressure is below twenty-five pounds to the square inch, for example, the valve stem may be turned down sufficiently that the throttling element 210 is not permitted to enter the throttling orifice, and any desired throttling is done between the seat element 207 and the top seating surface surrounding the throttling orifice, and for very low line pressures a non-throttling setting is used. This arrangement has been found to be quite satisfactory because no substantial throttling noise is experienced with line pressures below about twenty-five pounds.

Referring now particularly to Figure 3, this device has parts 301 to 319 which are similar generally to the parts 101 to 119 of Figure 1 and to the parts 201 to 219 of Figure 2. The restoring spring 309 has relatively weak characteristics like spring 209 of Figure 2, and unlike spring 109 of Figure 1. In addition, the traveling screen element has been changed to include a solid core member 312 with sloping sides covered with screen 315. The throttling port in the central web of the casting 301 has tapered sides, corresponding to the tapered sides of the throttling element 310. This throttling port is lined with a layer of screen 316, suitably soldered in place at the top edge and at the bottom edge thereof.

With the valve stem 303 adjusted in the position shown in the drawing, the traveling assembly moves up upon the initiation of flow until the top of the spring support 311 strikes the bottom of seat member 307. The movement is arrested in this position with the desired throttling separation between the parallel surfaces of screens 315 and 316. In this position, which permits the desired flow at one pressure, the velocity of the water is minimized by the frictional drag experienced as the water passes between the rough surfaces of screens 315 and 316, whereby the surfaces can be further apart than could smooth surfaces set for the same discharge rate under the same pressure. The result is a lower velocity at which the flow is quiet.

It will be understood, of course, that any other suitable method for obtaining an equally rough and friction-possessing surface may be used instead of applying the screens 315 and 316, but the screens are shown applied here because they may be conveniently attached.

The travelling assembly returns tro the relatively non-throttling position illustrated when the flow ceases.

The device T—3, as in the case of the devices T—1 and T—2 of Figures 1 and 2, is self-cleaning; it is washed with the free flow of water which occurs at the beginning of each flush before the travelling assembly has moved the element 310 into its final throttling position; and it is washed again as it is emerging from throttling position near the end of the flush.

The throttling device T—3 may be adjusted for other throttling positions by turning the valve stem 303 in the desired direction, less throttling being experienced as the stem 303 is turned in further from the illustrated position, while the device is set for correct throttling of higher pressures when the stem 303 is turned out to allow the element 310 to enter into a closer relationship with the sloping walls of the screen-lined throttling port.

It is to be noted that the part 350 which contains the cylinder in which the piston 313 operates is constructed as a separate part and is threaded into the main body-casting 301. This construction was adopted in order to enable the throttling element 310 to be placed within the housing from below, as it is too large to be passed through the throttle opening.

Referring again to Figure 6, it may be pointed out that the throttling device may be installed between the flush valve FV and the receptacle R if so desired. It will operate either way as regards silent throttling, but the illustrated arrangement is preferred for it permits the water to be shut off ahead of the flush valve when the flush valve is to be inspected or repaired.

We claim:

1. A velocity-impeding throttle member composed of a deep, flat-bottomed, cup-like screen held in place over a core consisting of a central hub and a number of radial screen-supporting arms.

2. A silencing cartridge composed of a supporting core and screen-like material surrounding the core and supported thereby, said core comprising a cylindrical section with radial slots milled therein extending in the direction of the axis and with a channel cut around the end to place the slots in common communication and to expose a larger inner surface of the core.

3. A throttle element composed of a rigid core channelled to permit free passage therethrough by way of the sides and ends thereof, a covering for the sides and ends of pervious sheet material, and a disc element lying between one end of the core and the said covering to block free passage through the core by way of that end.

4. A throttle element for use in a silent-throttling valve, said element being composed of a rigid core covered by pervious sheet material, there being a circular channel or key way in one end of the core having two opposed walls substantially parallel to the axis of the ring and into which the cover material is passed, and a circular key or ring forced into the channel and frictionally engaging the cover material and opposed wall of the channel.

WILLIAM E. SLOAN.
IRVING H. RUSSELL.